C. H. Shute,
Photographic Plate-Holder,
N°46,503. Patented Feb. 21, 1865.
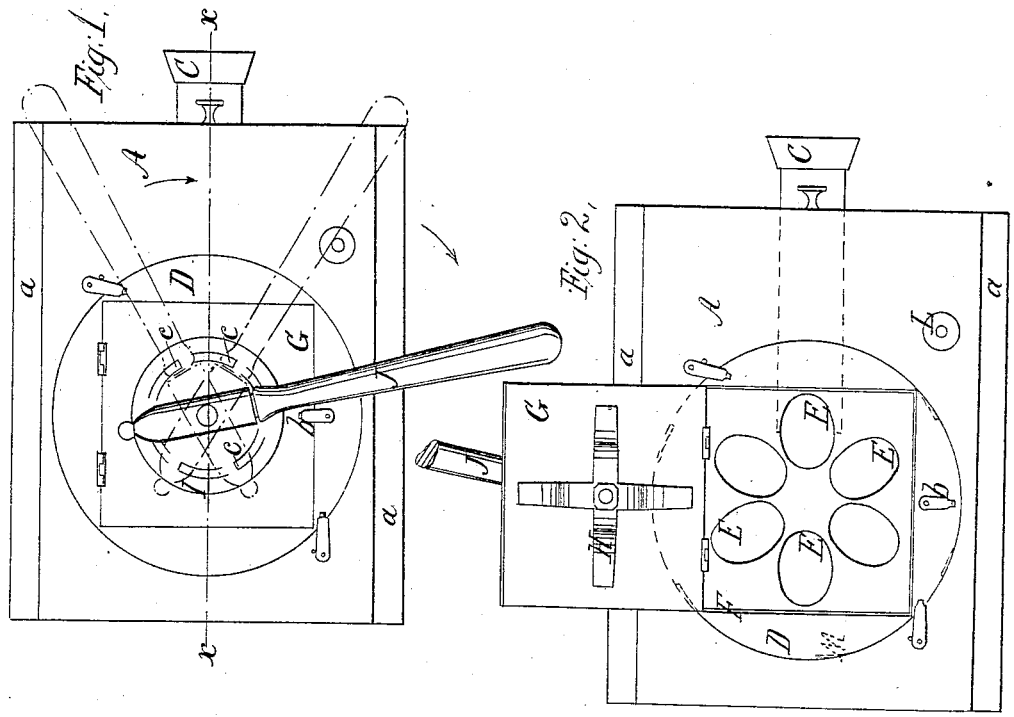
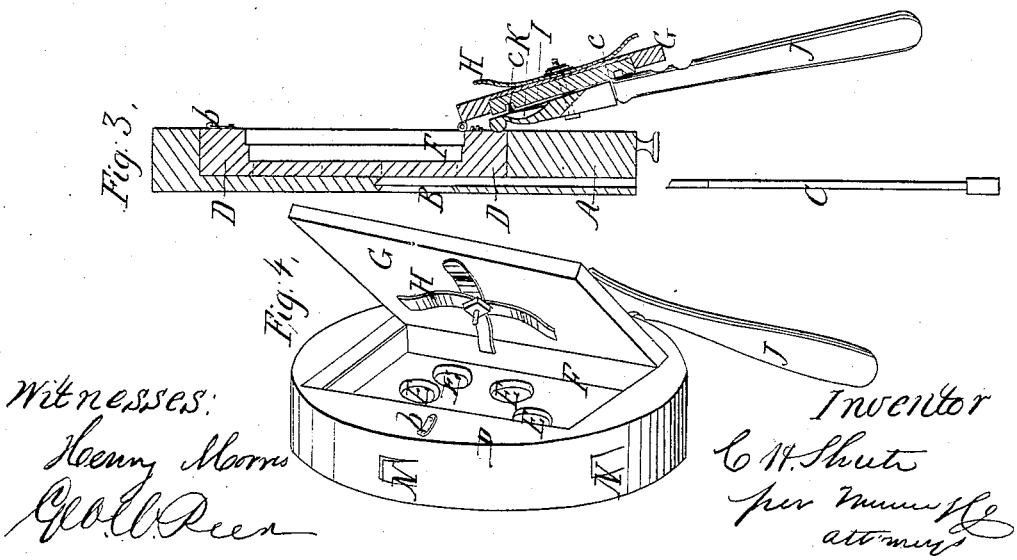
Witnesses:
Henry Morris
Geo. W. Reed
Inventor
C. H. Shute
per [attorney]

UNITED STATES PATENT OFFICE.

CHARLES H. SHUTE, OF EDGARTOWN, MASSACHUSETTS.

IMPROVEMENT IN ROTARY PHOTOGRAPHIC PLATE-HOLDERS.

Specification forming part of Letters Patent No. 46,593, dated February 21, 1865.

*To all whom it may concern:*

Be it known that I, CHARLES H. SHUTE, of Edgartown, in the county of Dukes and State of Massachusetts, have invented a new and useful Improvement in Photographic Rotary Plate-Holders; and I do hereby declare that the following is a full, clear, and exact description thereof, which will enable any one skilled in the art to make and use the same, reference being had to the accompanying drawings, making a part of this specification, in which—

Figure 1 is a side elevation showing the the holder closed. Fig. 2 is a side elevation showing the holder open to receive a photographic plate. Fig. 3 is a cross section through the line $x\,x$. Fig. 4 is a perspective view of the plate-box removed from the holder and enlarged.

Similar letters of reference indicate corresponding parts.

The object of this invention is to facilitate the taking of several different perspective upon one prepared or sensitized plate.

A is a photographic plate-holder or darkslide, the exterior form of which is similar to the holders ordinarily employed by photographers in connection with the camera. The edges of the holder A have the usual tongues, $a\,a$, to fit and slide into the usual grooves at the back of the camera. In the front of the holder A there is an aperture, B, through which the rays of light from the object to be photographed enter and strike upon the sensitized plate. The aperture B is opened and closed by the sliding cover C, which traverses a slot in the holder A in the manner shown. Behind the aperture B, and set into the body of the holder A, I have a round rotating box, D, through the front of which are made a series of apertures, E, corresponding in size and form to the aperture B. The box D and its apertures E are arranged in such a position behind the aperture B, that when the box D is rotated the apertures E will alternately be brought into line with the aperture B, so that the sensitized plate which is placed within the box D (as will shortly be described) will have as many alternate exposures to the light entering through B as there are apertures E in the box D. In the example here illustrated there are six apertures, E, in the box D; consequently a sensitized plate, when placed within the box D, may have six different exposures, so that six different pictures may be taken upon the plate by one rotation of the box D. I do not limit myself, however, to any particular number of exposing-apertures in the box D'.

The plate upon which the pictures are taken is placed within a recess, F, (square, or of other form,) made in the box D, substantially as shown. This recess F is closed, and the sensitized plate held therein by a hinged cover, G, which is kept shut by a button, $b$. The inner face of the cover G has upon it the usual pressing-springs, H, which bear against the back of the sensitized plate, and keep it in place when the cover G is closed.

Various means for rotating the box D may be employed. One method which I find useful in practice is as follows: Sunk in the back part of the cover G is a toothed plate, I, having as many teeth $c$ cut therein as there are apertures E in the box D. The teeth $c$ are beveled upon one side like ratchet-teeth. The distance apart of the teeth $c$ corresponds with the intervals between the apertures E.

J is a lever, pivoted to the center of box D upon the back of the cover G. That part of the lever J which rests upon the plate I is provided with a spring tooth or pawl, K, so arranged that when the lever J moves in direction of the arrow the tooth K engages the fronts of the teeth $c$, and the box D, with its contained plate, is rotated; but when the lever is moved in the contrary direction the tooth K rides over the inclined locks of the teeth $c$ and the box D remains at rest.

Upon the back of the holder A there is a stop-pin, L, which is intended to limit the strokes of the lever. After a picture has been taken, the slide C is closed, and the lever J is thrown up into the inclined position indicated by the red lines in Fig. 1, which movement causes the spring pawl or tooth K to engage a new tooth $c$ in the plate I. The lever J is then brought down against the stop-pin L, which causes a partial rotation of the box D and its contained sensitized plate, and also brings a new aperture, E, into line with the aperture B. The slide C is then withdrawn, so as to admit light to the sensitized plate. The picture having been taken, the slide C is again closed, the lever J moved up for a new stroke, and so on, until as many pictures have been taken as there are apertures E.

Within the periphery of the recess in the holder A, which receives the box D, there is a spring-tooth, M, which bears against the periphery of the box D, and falls into inclined pockets or ratchet-teeth N, cut in the said periphery of the box D. This spring-tooth acts like a ratchet to prevent the backward movement of the box D when the lever J is moved up for a new stroke.

The box D is held in its place within holder A by the buttons $d$ $d$ upon the holder A, as shown.

In the application of my improvement I do not limit myself to any particular form or size of the parts, for my invention may be used upon cameras of different kinds and sizes and for the taking of every variety of photographic pictures.

Having thus described my invention, what I claim as new, and desire to secure by Letters Patent, is—

The combination of the photographic dark-slide A, having an orifice, B, and slide C, with the rotating box carrying the plate, and pierced in its face with a series of openings to correspond with the opening B, as they are alternately exposed to it, the said box being rotated by a lever by means of a pin working into a ratchet on the back of the lid G, the circle of the ratchet-wheel being divided to correspond with orifices in the face of the rotating box.

CHARLES H. SHUTE.

Witnesses:
STEPHEN H. MORSE,
CORNELIUS CLARK.